Aug. 28, 1934.   D. S. OAKLEY   1,972,030
WHEEL TREADING MACHINE
Original Filed July 29, 1932   3 Sheets-Sheet 1

David S. Oakley
INVENTOR

BY Victor J. Evans & Co.
ATTORNEYS

Aug. 28, 1934.　　　D. S. OAKLEY　　　1,972,030
WHEEL TREADING MACHINE
Original Filed July 29, 1932　　3 Sheets-Sheet 2

David S. Oakley
INVENTOR

BY Victor J. Evans & Co.
ATTORNEYS

Aug. 28, 1934.　　　D. S. OAKLEY　　　1,972,030

WHEEL TREADING MACHINE

Original Filed July 29, 1932　　3 Sheets-Sheet 3

David S. Oakley
INVENTOR

BY Victor J. Evans & Co.
ATTORNEYS

Patented Aug. 28, 1934

1,972,030

UNITED STATES PATENT OFFICE 1,972,030

WHEEL TREADING MACHINE

David S. Oakley, Atlanta, Ga.

Application July 29, 1932, Serial No. 625,968
Renewed February 14, 1934

9 Claims. (Cl. 157—6)

The invention relates to a wheel treading machine and more particularly to machines for the treading of wheels of wood working machinery, such for example as bandsaws, belt sanders, etc.

The primary object of the invention is the provision of a machine of this character wherein endless friction bands may be readily and conveniently applied with dispatch to the wheels of wood working machines and without requiring the hand stretching in the application of such bands to the wheel as is commonly done at this time, the machine in its entirety being of novel construction.

Another object of the invention is the provision of a machine of this character wherein a series of fingers are controlled so that an endless band of the friction kind as ordinarily used on the wheels of bandsaws, belt sanders or the like may be acted upon to bring the tread band into a position for the mounting thereof upon the felly or rim of the wheel and also that will enable the convenient application of adhesive so that the tread band may be secured upon the wheel and in this fashion the treading of the wheel is had without the usual hand application, the steps in the application of the tread band to the wheel being carried forth with dispatch.

A further object of the invention is the provision of a machine of this character, wherein the endless band serving for the treading of the wheel of wood working machines will be presented to the wheel in a novel manner so that such band can be uniformly delivered to the wheel, the shaping of the band being carried forth through the instrumentality of fingers, these controlled from a feed point of the machine and are selectively releasable so as to assure the setting of the band upon the rim or felly of the wheel without liability of the said band becoming disarranged under the application thereof to the wheel for the true mounting of the same.

A still further object of the invention is the provision of a machine of this character, wherein the same is readily mountable with relation to the wheel and this is had with dispatch and with accuracy, the machine being capable of mounting upon a support when in operation for the treading of the wheel.

A still further object of the invention is the provision of a machine of this character, wherein the fingers for distorting or shaping the band used in the treading of the wheel of a band saw will be prevented during the introduction of such band upon the rim or felly of the wheel from working loose or prematurely releasing the band, particularly at the instant of setting the same upon the rim or felly of the wheel.

A still further object of the invention is the provision of a machine of this character, which is comparatively simple in construction, readily and easily adjusted to accommodate varying sizes of endless bands used for treading band saw wheels, thoroughly reliable and efficient in its purpose, readily and easily operated, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 6 is an enlarged detail perspective view of one of the fingers of the machine.

Figure 7 is a fragmentary detail perspective view of the spreader brace for the fingers.

Similar reference characters indicate corresponding parts throughout the several views in the drawings.

Figure 1:
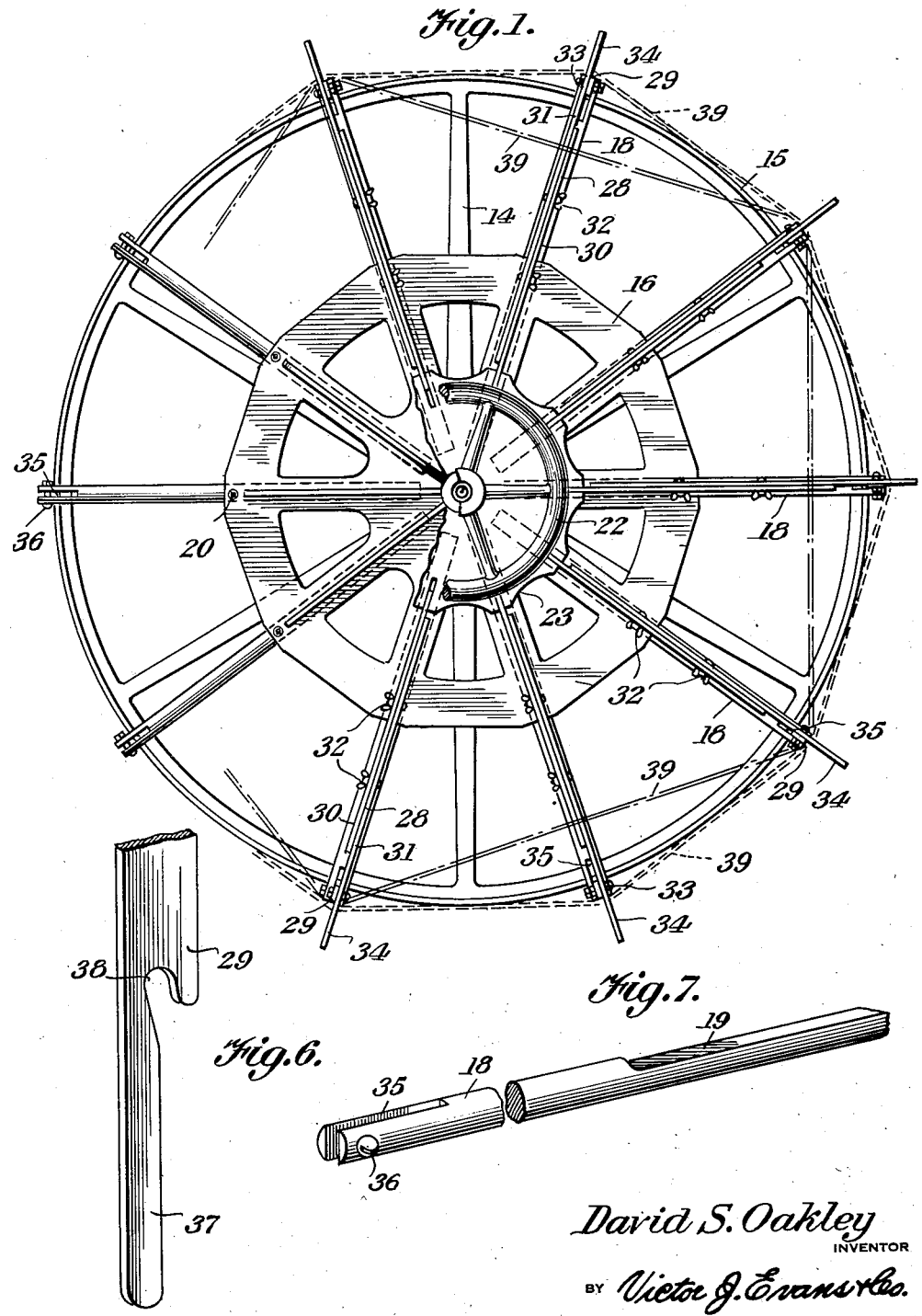
Figure 1 is a top plan view of the machine constructed in accordance with the invention, certain adjuncts thereof being broken away for detail purposes, the band being shown in full lines in its initial engagement with certain of the fingers of the machine and by dotted lines the set position for the reception thereof upon the rim or felly of the wheel.

Referring to the drawings in detail, the machine constituting the present invention in this instance comprises a stem 10 constituting the centering staff or post which, merely for the purposes of illustrating the supporting thereof, is removably fitted in a centrally socketed base 11 formed with a centering box 12 for accommodating the hub 13 of a spoked wheel 14 for wood working machines, such as a bandsaw, belt sander or the like, the wheel being of conventional type having the annular rim or felly 15 which latter in the operation of the machine is treaded by a friction band of the endless type.

Suitably secured to the stem 10 is a table or carrier in the form of a disk-like web 16, the same at its underside marginally thereof being formed with guide eyes 17, these being equally spaced from each other and in which are slidably fitted braces or fulcrum rods 18, each in the form of a rod having its inner end provided with a flattened upper side 19, in this instance the side being extended substantially one-half the length of the brace. Threaded into each eye 17 is a set screw 20 which engages the flat side 19 of its adjacent brace 18 so that in this manner the latter is susceptible of adjustment. The braces 18 are disposed on the carrier to extend radially therefrom and are guided through the eyes 17 when being adjusted according to the capacity of the machine.

It is preferable to have the carrier 16 fixed to the stem 10 and this may be had in any desirable manner.

The stem 10 for a greater portion of the upper half thereof is provided with screw threads 21 for the adjustable fitting thereon of a hand feed wheel 22 while traversible over the threaded portion 21 of the stem 10 is a spreader disk 23, its hub 24 loosely embracing the said stem 10 and carries a set screw 25 so that the disk 23 may be locked upon the stem at the adjusted point of the disk thereon. The disk 23 peripherally thereof is formed with pivot ears 26, these being arranged in spaced pairs equally distanced from each other marginally of the disk and carry pivots 27 for swingingly connecting companion inner and outer series of break jointed band applying or spreading fingers 28 and 29 respectively, the inner fingers being preferably extensible by the overlapped sections 30 and 31 thereof. These sections 30 and 31 are provided with registering holes accommodating removable fasteners 32 which engage selectively registering holes in the sections 30 and 31 to permit adjustment of said fingers 30 for increasing or decreasing the length thereof.

The outer fingers 29 are swingingly connected by pivots 33 to the fingers 28 at a point removed from the reduced tip or jaw ends 34 thereof.

Figure 2:
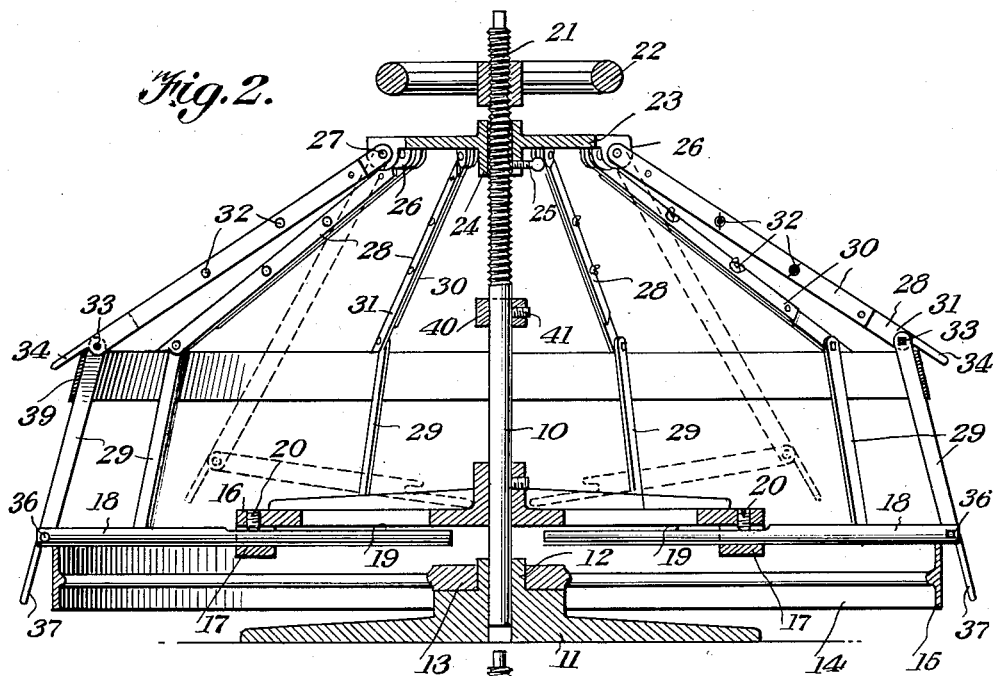
Figure 2 is a vertical longitudinal sectional view through the machine under the conditions as disclosed in Figure 1.
Figure 3:
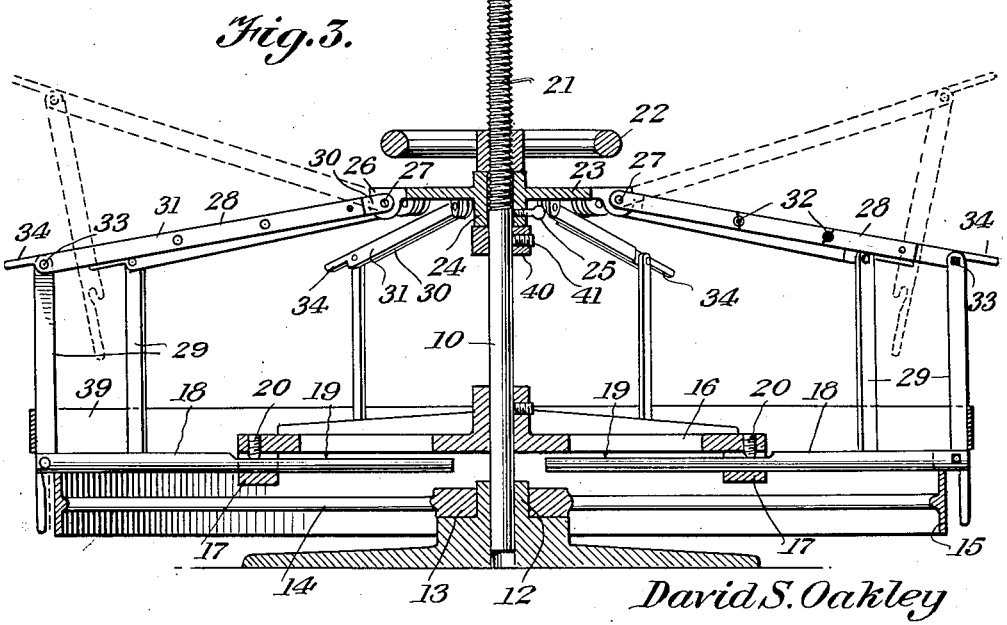
Figure 3 is a view similar to Figure 2 showing the fingers engaged with the band by full lines and those released therefrom by dotted lines.
Figure 4:
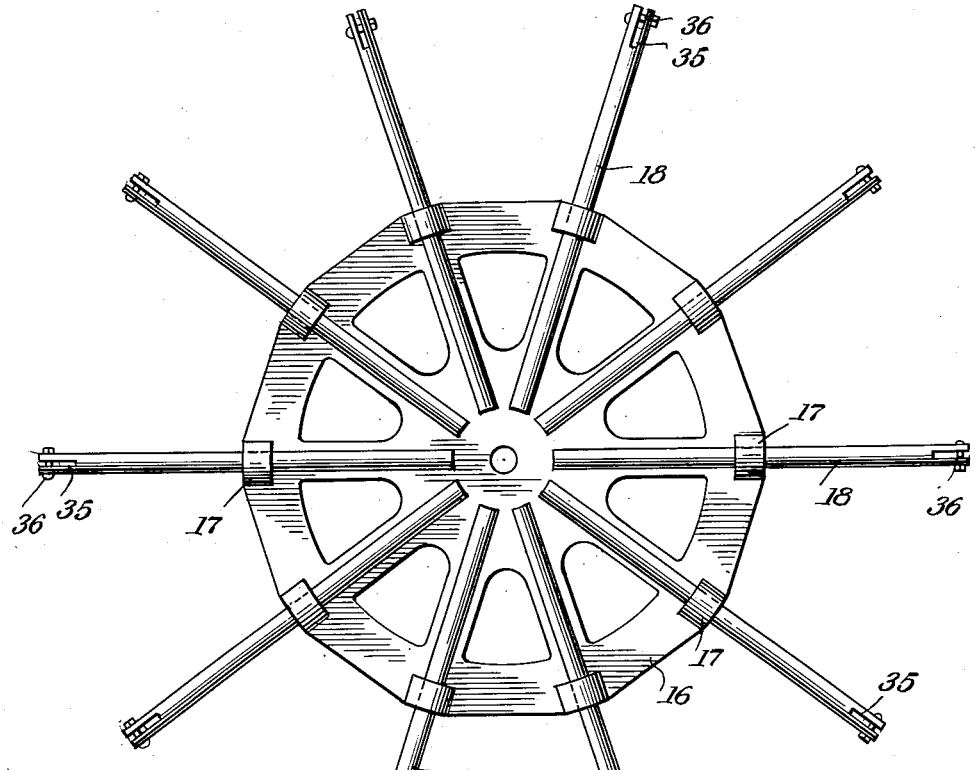
Figure 4 is a detail bottom plan view of the braces for said fingers and the carrier therefor.
Figure 5:
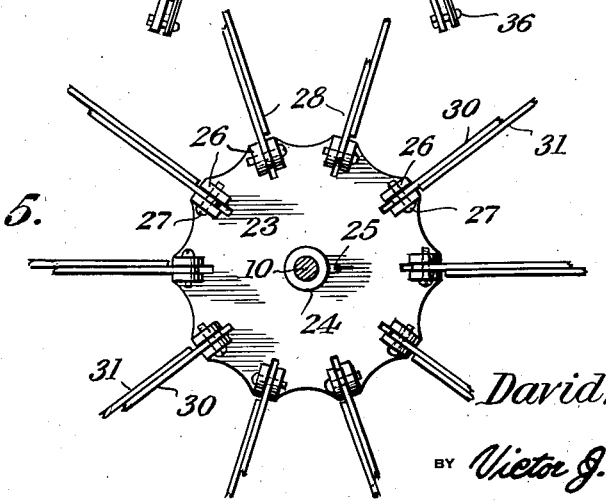
Figure 5 is a bottom plan view of the spreader disk for the fingers.

The braces 18 at their outer extremities are formed with bifurcated or forked ends 35, these being bridged by cross pins 36 which function as keeper fulcrums for the fingers 29 which are formed with free tip or jaw ends 37 alike to the tip or jaw ends 34 of the fingers 28 excepting that angularly disposed notches or seats 38 forming locking claws or grips are provided next to the inner ends of the tips or jaws 37 for the fulcrum pins 36. Thus the seats 38 when receiving the pins 36 will prevent the accidental separation of the fingers 29 when disposed in the forks 35 of the braces 18 particularly when such fingers 29 are disposed perpendicularly or parallel with the longitudinal axis of the stem 10 during the working of the machine. This perpendicular position of such fingers presents the tread band 39 when carried upon the said fingers 29 shapely for presentation onto the rim or felly 15 of the wheel 14. The band 39 when upon the fingers 29 is initially introduced thereon to circumferentially embrace certain of the same to underlie the tips or jaws 34 of the fingers 30 as is shown in Figure 2 of the drawings so that said band cannot work backwards. These fingers 29 and 30 will have been adjusted to assume the angular disposition as shown in said Figure 2 by manipulating the spreader disk 23 under pressure from the feed wheel 22. It is of course understood that the spreader disk 23 is moved upwardly on the stem 10 in the first instance to have the fingers 29 and 30 in angular alignment with each other. It is only necessary that selected ones of these fingers 29 and 30 be brought into the angular alignment with each other, while the other fingers will rest upon the carrier 16 on initial mounting of the band 39. Then these fingers at rest are manually brought in single order to engaging position with the band alike to the other fingers. Whereupon the disk 23 is moved downwardly upon the stem 10 which causes all of the fingers 29 to move to perpendicular position and to uniformly spread the same at intervals throughout the circular extent thereof for the shaping of such band and the sizing thereof comparable with the rim or felly 15 of the wheel 14. In this condition the band 39 can be moved downwardly upon the fingers 29 in close relation to the rim or felly 15 of the wheel 14 as is shown in Figure 3 of the drawings. In this close relation the band can be readily introduced onto the felly or rim but prior thereto an adhesive is applied to the said felly or rim and likewise to the inner surface of the band for the securing of such band upon the rim or felly of the wheel.

When the band has been forced upon the tips or jaws 37 of the fingers 29 with embracing relation to the wheel at the felly or rim thereof, thereby upon presentation of said band to the rim or felly it will be made fast or secure thereon. Under this application of the band to the felly or rim of the wheel the operator of the machine singly at selected peripheral points with respect to the band and felly or rim releases individually the fingers 29 from engagement with the band to free the same, whereby the inherent resiliency of the latter will cause it to snugly embrace the felly or rim 15 and become applied thereto. This method of application of the band to the felly or rim of the wheel 14 can be carried forth with dispatch, the selective individual release of the fingers 29 from the band 39 being indicated by dotted lines in Figure 3 of the drawings, while by full lines the remaining fingers 29 are shown in their grasping position with the band.

The stem 10 carries a stop collar 40 for the spreader disk 23 and this collar is provided with a set screw 41 for permitting adjustment thereof upon the stem 10, the collar 40 being adapted to limit the downward movement of the spreader disk 23 on the stem when acted upon by the feed wheel 22, the latter holding the spreader disk 23 against the collar 40 when the fingers 29 have been adjusted to perpendicular position as is shown in Figure 3 of the drawings.

The braces and fingers of the applying machine can be readily and easily adjusted according to the size of the wheel and the band to be applied thereto for the treading of the felly or rim of said wheel.

In the working of the machine the band 39 initially is slipped onto certain of the fingers 29 over the fingers 28, this method of engagement being shown in Figure 1 of the drawings and thereafter the shaping of the band 39 will take place by the spreading of the other fingers 29 which extends the band throughout at the points of contact of the fingers 29 therewith. When the fingers 29 have been adjusted to perpendicular position or parallel with the longitudinal axis of the stem 10 the band will then be stretched and shaped as well as sized correspondingly to the felly or rim 15 of the wheel 14 to be treaded by said band so that the latter can be readily applied to the felly or rim 15 of the wheel as hereinbefore described.

It will be understood of course that the machine in the use thereof may have the wheel 14 rest upon the open end of a barrel which open end in its circumference is less than the size of the wheel and in this instance the stem 10 will be engaged in the hub of the wheel and properly centered relative thereto. On the moving of the band 39 from the fingers 29 after such band has reached the position as shown in Figure 3 of the drawings with respect to the rim or felly 15 of the wheel 14 the fingers 29 selectively and individually are pulled upon to disengage the same from the band 29. Under this pulling action the said fingers will be snapped out of engagement with said band and the latter will contract about the rim or felly of the wheel at the released points of engagement of said fingers therewith so that the band will become engaged and secured upon the felly or rim of said wheel and this operation may be carried forth with dispatch for the successful treading of such wheel.

The machine is especially adaptable for the treading of the wheels of bandsaws, belt sanders or the like and in the operation thereof will eliminate the hand stretching of the friction tread for the wheel and also will assure the proper treading of said wheel by the mechanical stretching of the friction band. Also this band in its stretched condition will be presented to the rim or felly of the wheel and thus may be applied thereto in an easy and convenient manner as should be obvious.

What is claimed is:

1. A wheel tread applying machine comprising a stem adapted for centering with respect to a bandsaw wheel, a spreader disk movable upon said stem, pivotally joined inner and outer spreader fingers carried by said disk, means on the stem for the fulcruming of the inner fingers, and means carried by the stem for moving the spreader disk for the adjustment of the spreader fingers when said inner fingers are engaged with the fulcruming means.

2. A wheel tread applying machine comprising a stem adapted for centering with respect to a bandsaw wheel, a spreader disk movable upon said stem, pivotally joined inner and outer spreader fingers carried by said disk, means on the stem for the fulcruming of the inner fingers, means carried by the stem for moving the spreader disk for the adjustment of the spreader fingers when said inner fingers are engaged with the fulcruming means, and jaw tips at the free ends of said fingers.

3. A wheel tread applying machine comprising a stem adapted for centering with respect to a bandsaw wheel, a spreader disk movable upon said stem, pivotally joined inner and outer spreader fingers carried by said disk, means on the stem for the fulcruming of the inner fingers, means carried by the stem for moving the spreader disk for the adjustment of the spreader fingers when said inner fingers are engaged with the fulcruming means, jaw tips at the free ends of said fingers, and means for holding the spreader disk in adjusted condition.

4. A wheel tread applying machine comprising a stem adapted for centering with respect to a bandsaw wheel, a spreader disk movable upon said stem, pivotally joined inner and outer spreader fingers carried by said disk, means on the stem for the fulcruming of the inner fingers, means carried by the stem for moving the spreader disk for the adjustment of the spreader fingers when said inner fingers are engaged with the fulcruming means, jaw tips at the free ends of said fingers, means for holding the spreader disk in adjusted condition, and means for permitting adjustment of the fulcruming means.

5. A machine of the character described comprising a table, a plurality of fulcrum rods radially mounted upon the table, a spreader disk adjustable relative to the table, a plurality of pivotally supported spreader fingers carried by said disk and releasably fulcrumed upon the fulcrum rods, and means for adjusting the said fingers to increase or decrease the spreading action thereof.

6. A machine of the character described comprising a table, a plurality of fulcrum rods radially mounted upon the table, a spreader disk adjustable relative to the table, a plurality of pivotally supported spreader fingers carried by said disk and releasably fulcrumed upon the fulcrum rods, means for adjusting the said fingers to increase or decrease the spreading action thereof, and means for adjusting the fulcrum rods.

7. A machine of the character described comprising a table, a plurality of fulcrum rods radially mounted upon the table, a spreader disk adjustable relative to the table, a plurality of pivotally supported spreader fingers carried by said disk and releasably fulcrumed upon the fulcrum rods, means for adjusting the said fingers to increase or decrease the spreading action thereof, means for adjusting the fulcrum rods, and means for shifting the spreader disk relative to the table.

8. A machine of the character described comprising a table, a plurality of fulcrum rods radially mounted upon the table, a spreader disk adjustable relative to the table, a plurality of pivotally supported spreader fingers carried by said disk and releasably fulcrumed upon the fulcrum rods, means for adjusting the said fingers to increase or decrease the spreading action thereof, means for adjusting the fulcrum rods, means for shifting the spreader disk relative to the table, and a centering stem carrying said table and spreader disk.

9. A machine of the character described comprising a table, a plurality of fulcrum rods radially mounted upon the table, a spreader disk adjustable relative to the table, a plurality of pivotally supported spreader fingers carried by said disk and releasably fulcrumed upon the fulcrum rods, means for adjusting the said fingers to increase or decrease the spreading action thereof, means for adjusting the fulcrum rods, means for shifting the spreader disk relative to the table, a centering stem carrying said table and spreader disk, and locking claws on said fingers for engaging the fulcrum rods to prevent separation of the fingers therefrom during a determined period of operation of said fingers.

DAVID S. OAKLEY.